United States Patent
Ljung et al.

(10) Patent No.: US 10,165,496 B2
(45) Date of Patent: Dec. 25, 2018

(54) TERMINAL DEVICE HAVING A RELAY FUNCTION AND METHOD OF PROVIDING INFORMATION RELATED TO A RELAY FUNCTION

(71) Applicant: Sony Corporation, Tokyo (JP)

(72) Inventors: Rickard Ljung, Helsingborg (SE); Saif Alnashi, Staffanstorp (SE)

(73) Assignees: SONY CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 0 days.

(21) Appl. No.: 14/384,098

(22) PCT Filed: Sep. 2, 2013

(86) PCT No.: PCT/IB2013/001883
§ 371 (c)(1),
(2) Date: Sep. 9, 2014

(87) PCT Pub. No.: WO2015/015242
PCT Pub. Date: Feb. 5, 2015

(65) Prior Publication Data
US 2015/0215028 A1    Jul. 30, 2015

Related U.S. Application Data

(63) Continuation of application No. PCT/IB2013/001650, filed on Jul. 30, 2013.

(51) Int. Cl.
*H04W 4/00* (2018.01)
*H04W 40/22* (2009.01)
(Continued)

(52) U.S. Cl.
CPC ........ *H04W 40/22* (2013.01); *H04B 7/15507* (2013.01); *H04W 4/06* (2013.01);
(Continued)

(58) Field of Classification Search
None
See application file for complete search history.

(56) References Cited

U.S. PATENT DOCUMENTS

2007/0127421 A1    6/2007  D'Amico et al.
2009/0325622 A1    12/2009 Matsumura et al.
(Continued)

FOREIGN PATENT DOCUMENTS

JP    2001036459 A    2/2001
JP    2007096988 A    4/2007
(Continued)

OTHER PUBLICATIONS

ZTE: "ProSe UE-to-Network Relay", 3GPP Draft; S2-133038—Application Based Prose Relays, 3rd Generation Partnership Project (GPP), Mobile Competence Centre; 350, Route des Lucioles, F-06921, Sophia-Antipolis Cedex, France; vol. SA WG2, No. Valencia, Spain, Jul. 15, 2013-Jul. 19, 2013, Jul. 19, 2013, XP050726383, Retrieved from the Internet: URL:http://www.3gpp.org/ftp/tsg_sa/WG2_Arch/TSG2_98_Valencia/Docs/ [retrieved on Jul. 19, 2013].
(Continued)

*Primary Examiner* — Anh Vu H Ly
(74) *Attorney, Agent, or Firm* — Tucker Ellis LLP

(57) ABSTRACT

A terminal device for wireless communication comprises a wireless interface configured for communication with a radio access network of a cellular communication network. The terminal device is configured to transmit, via the wireless interface, a message to at least one other terminal. The message includes configuration information related to a relay function of the terminal device. The terminal device is
(Continued)

configured to activate the relay function to start relaying communication between a requesting terminal of the at least one other terminal and the radio access network after transmission of the message.

19 Claims, 7 Drawing Sheets

(51) Int. Cl.
| | |
|---|---|
| *H04W 88/04* | (2009.01) |
| *H04B 7/155* | (2006.01) |
| *H04W 4/06* | (2009.01) |
| *H04W 8/00* | (2009.01) |
| *H04W 4/021* | (2018.01) |
| *H04W 88/18* | (2009.01) |

(52) U.S. Cl.
CPC .......... *H04W 8/005* (2013.01); *H04W 88/04* (2013.01); *H04W 4/021* (2013.01); *H04W 88/182* (2013.01)

(56) References Cited

U.S. PATENT DOCUMENTS

| | | | |
|---|---|---|---|
| 2011/0124312 A1 | 5/2011 | Kwon et al. | |
| 2012/0183141 A1* | 7/2012 | Hapsari | H04L 63/061 380/272 |
| 2013/0016708 A1* | 1/2013 | Haba | H04W 48/16 370/338 |
| 2013/0083722 A1 | 4/2013 | Bhargava et al. | |
| 2013/0288668 A1* | 10/2013 | Pragada | H04W 12/06 455/426.1 |
| 2013/0325407 A1 | 12/2013 | Lee | |
| 2014/0010108 A1* | 1/2014 | Tavildar | H04W 8/005 370/254 |
| 2014/0119272 A1* | 5/2014 | Wong | H04W 40/04 370/315 |
| 2014/0126462 A1* | 5/2014 | Vardhan | H04B 7/15507 370/315 |
| 2014/0198708 A1* | 7/2014 | Lee | H04W 76/023 370/312 |
| 2014/0219161 A1* | 8/2014 | Kowalewski | H04W 88/04 370/315 |
| 2014/0307611 A1* | 10/2014 | Tesanovic | H04W 8/005 370/312 |
| 2015/0029866 A1* | 1/2015 | Liao | H04W 4/008 370/241 |
| 2015/0127733 A1* | 5/2015 | Ding | H04W 4/08 709/204 |
| 2015/0208225 A1* | 7/2015 | Yu | H04W 4/008 370/329 |
| 2015/0215984 A1* | 7/2015 | Schmidt | H04W 76/023 455/552.1 |

FOREIGN PATENT DOCUMENTS

| | | |
|---|---|---|
| JP | 2008271523 A | 11/2008 |
| JP | 2012074757 A | 4/2012 |
| JP | 2013062619 A | 4/2013 |
| WO | 2014184600 A1 | 11/2014 |

OTHER PUBLICATIONS

"3rd Generation Partnership Project; Technical Specification Group Services and System Aspects; Study on architecture enhancements to support Proximity Services (ProSe) (Release 12)", 3GPP Draft; 23703-050-PROSE-RM, 3rd Generation Partnership Project (GPP), Mobile Competence Centre; 650, Route des Lucioles, F-06921, Sophia-Antipolis Cedex, France; Jul. 27, 2013, XP050725380, Retrieved from the Internet: URL:http://www.3gpp.org/ftp/tsg_sa/WG2_Arch/Latest_SA2_Specs/Latest_draft_S2_Specs/ [retrieved on Jul. 27, 2013] section 06.3.1.

International Search Report and Written Opinion; dated Mar. 31, 2014; issued in International Patent Application No. PCT/IB2013/001650.

International Search Report and Written Opinion; dated Mar. 31, 2014; issued in International Patent Application No. PCT/IB2013/001883.

"3rd Generation Partnership Project; Technical Specification Group Services and System Aspects; Service requirements for the Evolved Packet System (EPS) (Release 12)". 3GPP TS 22.278 V12.3.0 (Jun. 2013).

"3rd Generation Partnership Project; Technical Specification Group Services and System Aspects; Feasibility study for Proximity Services (ProSe) (Release 12)". 3GPP TR 22.803 V12.2.0 (Jun. 2013).

"3rd Generation Partnership Project; Technical Specification Group Services and System Aspects; Study on architecture enhancements to support Proximity Services (ProSe) (Release 12)". 3GPP TR 23.703 V0.4.1 (Jun. 2013).

"3rd Generation Partnership Project; Technical Specification Group Radio Access Network; Evolved Universal Terrestrial Radio Access (E-UTRA); Radio Resource Control (RRC); Protocol specification (Release 11)" 3GPP TS 36.331 V11.4.0 (Jun. 2013).

"3rd Generation Partnership Project; Technical Specification Group Radio Access Network; Evolved Universal Terrestrial Radio Access (E-UTRA); Relay architectures for E-UTRA (LTE-Advanced) (Release 9)". 3GPP TR 36.806 V9.0.0 (Mar. 2010).

ZTE, "ProSe UE-to-Network Relay", 3GPP S2-133038, SA WG2 Meeting #98, Jul. 15, 2013.

3rd Generation Partnership Project; Technical Specification Group Services and System Aspects; Service requirements for the Evolved Packet System (EPS) (Release 12); 3GPP TS 22.278 V12.2.0 (Mar. 2013).

3rd Generation Partnership Project; Technical Specification Group Services and System Aspects; Feasibility study for Proximity Services (ProSe) (Release 12); 3GPP TR 22.803 V12.1.0 (Mar. 2013).

* cited by examiner

TERMINAL DEVICE HAVING A RELAY FUNCTION AND METHOD OF PROVIDING INFORMATION RELATED TO A RELAY FUNCTION

FIELD OF THE INVENTION

The invention relates to wireless communication systems. The invention relates in particular to techniques which allow a terminal device of the wireless communication system to start acting as a relay.

BACKGROUND OF THE INVENTION

The demand for mobile data and voice communication continues to evidence significant growth. Examples for wireless communication systems include cellular-based wireless communication networks. Such networks include various network nodes. The network nodes may include base stations which respectively provide coverage for a radio cell.

A terminal located outside of the coverage areas of the base stations cannot communicate with a radio access network of the wireless communication system. To improve the coverage of the wireless communication system, the number and density of installed base stations may be increased to provide additional radio cells. Alternatively or additionally, dedicated relays may be provided. With a relay, the signals transmitted between a base station and a terminal may be repeated, i.e. forwarded or sent again, in order to improve network coverage. The dedicated relays may be fixedly installed or may be mobile devices.

In addition to the extension of coverage achievable by deploying dedicated relays, there may be other reasons for using a relay. One scenario may be that the wireless communication system shall be able to dynamically increase its network coverage to support emergency services required for public safety requirements.

Therefore, in such a communication system it may be required to quickly expand network coverage and capacity at specific locations, even if these locations are at the border or outside the ordinary network coverage area. In another scenario it may be required that the coverage of a radio cell should be dynamically increased due to a failure of a neighboring base station. When several candidate relays are available, a suitable transmission path may be identified under the control of a base station or a control node in a radio access network or core network. However, such approaches may suffer from reduced flexibility and/or may add to traffic loads in a radio access network.

The deployment of dedicated relays or additional base stations may add to the costs of the wireless communication network, both as regards installation and as regards maintenance. The techniques outlined above may also suffer from reduced flexibility.

SUMMARY OF THE INVENTION

There is a need in the art for techniques which allow the coverage of a radio cell of a wireless communication system to be dynamically increased at low cost. There is in particular a need for such techniques in which a device which can transition into a relay may be identified in an efficient way.

According to exemplary embodiments of the invention, a terminal and method as recited in the independent claims are provided. The dependent claims define further embodiments.

According to an embodiment, a terminal device for wireless communication is provided. The terminal device comprises a wireless interface configured for communication with a radio access network of a cellular communication network. The terminal device is configured to transmit, via the wireless interface, a message to at least one other terminal, the message including configuration information related to a relay function of the terminal device. The terminal device is configured to activate the relay function to start relaying communication between a requesting terminal of the at least one other terminal and the radio access network after transmission of the message.

The terminal device is configured to transmit a message including configuration information to at least one other terminal. This allows the other terminal to determine whether the terminal device would be suitable for acting as a relay. The terminal device may be requested to selectively activate the relay function only when the terminal device is identified as being suitable for transitioning into a relay.

The terminal device may be a user equipment.

The terminal device may be a portable user equipment.

The configuration information may be indicative of how suitable the terminal device is for acting as a relay.

The terminal device may be a proximity service enabled (ProSe-enabled) user equipment (UE). The terminal device may be a UE which supports ProSe requirements. This allows the message to be transmitted directly from the terminal device to the at least one other terminal, without transitioning the radio access network.

The terminal device may be ProSe-enabled Public Safety UE, i.e., a ProSe-enabled UE that also supports ProSe procedures and capabilities specific to Public Safety.

The terminal device may be configured to transmit the message which includes the configuration information as ProSe one-to-one communication to respectively one other terminal of the at least one other terminal.

The terminal device may be configured to transmit the message which includes the configuration information as RRC Radio Resource Control (RRC) signaling or Non Access Stratum (NAS) signaling.

The terminal device may be configured to transmit the message which includes the configuration information as a part of Internet Protocol (IP) communication. The terminal device may be configured to transmit the message which includes the configuration information as IP traffic.

The terminal device may be configured to transmit the message which includes the configuration information as ProSe one-to-many communication to respectively several other terminals of the at least one other terminal.

The configuration information may include at least one data element generated by the terminal device to generate the message including the configuration information.

The configuration information may include at least one data element selected from a group consisting of:
  mobility data for the terminal device indicative of a movement velocity of the terminal device;
  an output power capability indicator indicating an output power of the terminal device which is available for the relay function;
  channel quality information providing historical data on radio channel properties of the terminal device;
  data capability information indicating an available data transfer capability of the terminal device;
  relay capacity information indicating for how many other terminals the terminal device is capable of relaying communication;

power supply information determined based on a power supply available at the terminal device.

The configuration information transmitted in the message may include at least both the mobility data and the output power capability indicator. This allows the at least one other terminal device to determine the suitability of the terminal device for acting as a relay, when considering the movement and the output power capability of the terminal device. A terminal device may be identified as being suitable as a repeater if its movement velocity is low and/or its output power capability for the relay function is high.

The terminal device may be configured to transmit the message which includes the configuration information to the at least one other terminal in response to receiving a request for the configuration information from the at least one other terminal.

The terminal device may be configured to transmit an announcement message indicating that the terminal device is capable of acting as a relay to the at least one other terminal prior to receiving the request for configuration information.

The terminal device may be configured to relay communication between at least one other terminal and a Donor eNodeB, DeNB, of the radio access network.

The terminal device may be configured to relay data communication between the at least one other terminal and the DeNB.

The terminal device may be configured to communicate with the DeNB over a Un air interface.

The terminal device may be a mobile telephone.

A communication system according to an embodiment comprises the terminal device of an embodiment and at least one other terminal having a wireless interface configured for communication with the radio access network. The at least one other terminal is configured to receive the message transmitted by the terminal device and to evaluate the configuration information included in the message to determine whether the terminal device is suitable for relaying communication between the at least one other terminal and the radio access network.

The at least one other terminal may be configured to perform a prioritization among the terminal device and another candidate relay based on the configuration information included in the message transmitted by the terminal device.

The communication system may comprise an eNodeB configured to act as a Donor eNodeB (DeNB). The terminal device may be configured to relay communication between the at least one other terminal and the DeNB when the relay function of the terminal device is activated.

According to another embodiment, a method of providing information related to a relay function of a terminal device is provided. The terminal device comprises a wireless interface configured for communication with a radio access network of a cellular communication network. The method comprises transmitting, via the wireless interface of the terminal device, a message from the terminal device to at least one other terminal, the message including configuration information related to a relay function of the terminal device. The method comprises activating the relay function to start relaying communication between a requesting terminal of the at least one other terminal and the radio access network after transmission of the message.

The method may be performed by the terminal device according to an embodiment.

The message which includes the configuration information may be transmitted as ProSe one-to-one communication to respectively one other terminal of the at least one other terminal.

The message which includes the configuration information may be transmitted as ProSe one-to-many communication to respectively several other terminals of the at least one other terminal.

The message which includes the configuration information may be an RRC Radio Resource Control (RRC) signaling message or a Non Access Stratum (NAS) signaling message.

The message which includes the configuration information may be Internet Protocol (IP) communication. The message which includes the configuration information may be transmitted as IP traffic.

The method may comprise generating, by the terminal device, at least one data element to generate the message including the configuration information.

The configuration information may include at least one data element selected from a group consisting of:
  mobility data for the terminal device indicative of a movement velocity of the terminal device;
  an output power capability indicator indicating an output power of the terminal device which is available for the relay function;
  channel quality information providing historical data on radio channel properties of the terminal device;
  data capability information indicating an available data transfer capability of the terminal device;
  relay capacity information indicating for how many other terminals the terminal device is capable of relaying communication;
  power supply information determined based on a power supply available at the terminal device.

The configuration information transmitted in the message may include at least both the mobility data and the output power capability indicator.

The message which includes the configuration information may be transmitted to the at least one other terminal in response to receiving a request for the configuration information from the at least one other terminal.

The method may comprise transmitting an announcement message indicating that the terminal device is capable of acting as a relay, the announcement message being transmitted to the at least one other terminal prior to receiving the request.

The method may comprise relaying communication between the at least one other terminal and a Donor eNodeB, DeNB, of the radio access network.

The method may comprise relaying data communication between the at least one other terminal and the DeNB.

In the devices, methods and systems according to embodiments, the signaling between the terminal device and the at least one other terminal may be implemented as device-to-device communication.

In the devices, methods, and systems according to embodiments, the terminal device with activated relay function may be a unit which has the capability of relaying or forwarding information in any direction between a base station and the at least one other terminal. The relay function may be applied at any protocol layer. The relay function may be implemented at the physical layer. The relay function activated in the terminal device may be operative to perform physical layer signal forwarding The relay function may be implemented at the second layer, the third layer or higher layers of the Open Systems Interconnection (OSI) layer model. The relay function which may be activated in the terminal device may be operative to perform decoding/encoding and/or demodulating/modulating information for relay functionality applied at higher protocol layers of the OSI layer model.

The devices, methods and systems according to various embodiments provide a signaling which allows a terminal to identify the terminal device as a candidate for the purpose of transforming this terminal device to a relay in a wireless communication system.

Although specific features described in the above summary and the following detailed description are described in the context of specific embodiments and aspects of the invention, the features of the embodiments and aspects may be combined with each other unless specifically noted otherwise.

BRIEF DESCRIPTION OF THE DRAWINGS

Embodiments of invention will now be described in more detail with reference to the accompanying drawings.

DETAILED DESCRIPTION OF PREFERRED EMBODIMENTS

Figure 1:
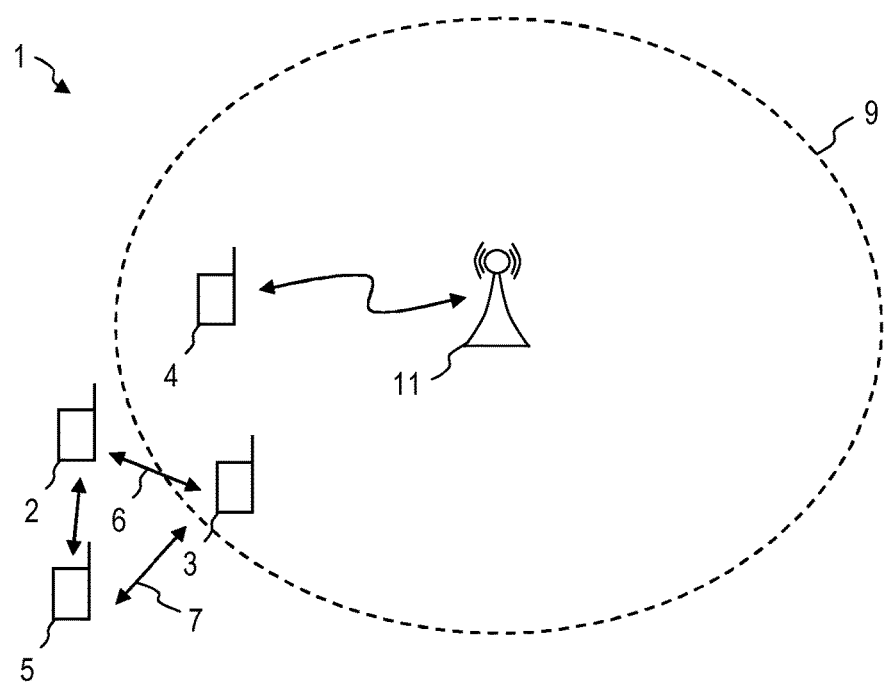
FIG. 1 shows a communication system according to an embodiment.

In the following, exemplary embodiments of the invention will be described in more detail. It has to be understood that the features of the various exemplary embodiments described herein may be combined with each other unless specifically noted otherwise. Identical or similar reference numerals refer to identical or similar components.

FIG. 1 shows a communication system 1 according to an embodiment. The communication system 1 is configured as a cellular wireless communication system. The communication system 1 may comprise a plurality of base stations. One of the base stations is shown as base station 11 in FIG. 1. The base stations may communicate with each other via wireless radio communications or via an operator core network. The communication network may be a Long Term Evolution (LTE) network. A radio access network (RAN) of the communication network may be an evolved UTRAN (E-UTRAN), with the base station 11 being an evolved Node B (eNodeB). The base station 11 may be connected to a Mobility Management Entity (MME) and/or Serving Gateway (S-GW) in the core network.

The base station 11 provides a radio cell 9 in which terminal devices 3, 4 may communicate directly with the base station 11 via radio frequency communication. The terminal devices 3, 4 may respectively have a wireless interface for communication with the E-UTRAN.

At least one other terminal 2, 5 may be located outside the radio cell 9, i.e., outside the coverage of the base station 11. The at least one other terminal 2, 5 may also have a wireless interface configured for communication with the E-UTRAN or another RAN. However, when the at least one other terminal 2, 5 is located outside of the radio cell 9, as illustrated in FIG. 1, it cannot directly communicate with the base station 11.

The terminal devices 3, 4 which are candidate relays and the other terminals 2, 5 which may request activation of a relay function may respectively be devices used directly by an end-user to communicate. Both the terminal devices 3, 4 and the other terminals 2, 5 may respectively be configured as handheld devices or other devices operated by an end-user. In particular, the terminal devices 3, 4 and the other terminals 2, 5 may be a user equipment (UE) as defined in 3GPP LTE. The term "terminal device" will generally be used herein to refer to the devices which transmit a message including configuration information related to a relay function of the respective terminal device. The terminal devices 3, 4 and the other terminals 2, 5 may respectively be a mobile communication terminal, which may be implemented as a hand-held telephone, a personal digital assistant, a computing device equipped with a mobile communication adapter, a machine having a mobile communication interface, or any one of a wide variety of other devices.

The terminal device 3 is configured to directly communicate with the terminal device 4 and/or the other terminals 2, 5 located in proximity to the terminal device 3. The corresponding device-to-device (D2D) communication 6, 7 does not need to be, and generally is not, transmitted via any one of the base stations of the wireless communication network. As will be explained in more detail below, the terminal device 3 may perform D2D communication to provide configuration information related to a relay function of the terminal device 3 to at least one other terminal 2, 5. The configuration information allows the at least one other terminal 2, 5 to determine whether the terminal device 3 is suitable to start acting as a relay for relaying messages between the at least one other terminal 2, 5 and the base station 11. The at least one other terminal 2, 5 may request the terminal device 3 to start acting as a repeater if the at least one other terminal 2, 5 determines, based on the configuration information transmitted by the terminal device 3, that the terminal device 3 is suitable for acting as a relay. Before the terminal device 3 starts acting as a relay, the terminal device 3 may be operative as a conventional mobile communication terminal which does not perform any relay function when it transmits the message including the configuration information to the at least one other terminal 2, 5.

As will be explained in more detail below, the terminal device 3 is configured to generate several data elements of a configuration information which relate to the suitability of the terminal device 4 for acting as a relay. The terminal device 3 is configured to transmit a message including the configuration information to at least one other terminal 2, 5 which fulfills proximity criteria, i.e., which is located sufficiently close to the terminal device 3 such that it meets pre-defined proximity criteria. The terminal device 3 may transmit the message including the configuration information in response to a request for configuration information received from the at least one other terminal 2, 5. The terminal device 3 may selectively activate a relay function after transmission of the message which includes the configuration information. The terminal device 3 may activate the relay function in response to a relay transition request to activate the relay function, the relay transition request being directly received from one of the other terminals 2, 5 to which the message with the configuration information was previously transmitted. The relay function activated in the terminal device 3 may perform relaying or forwarding of data or signaling messages at the physical layer or at higher layers.

Figure 2:
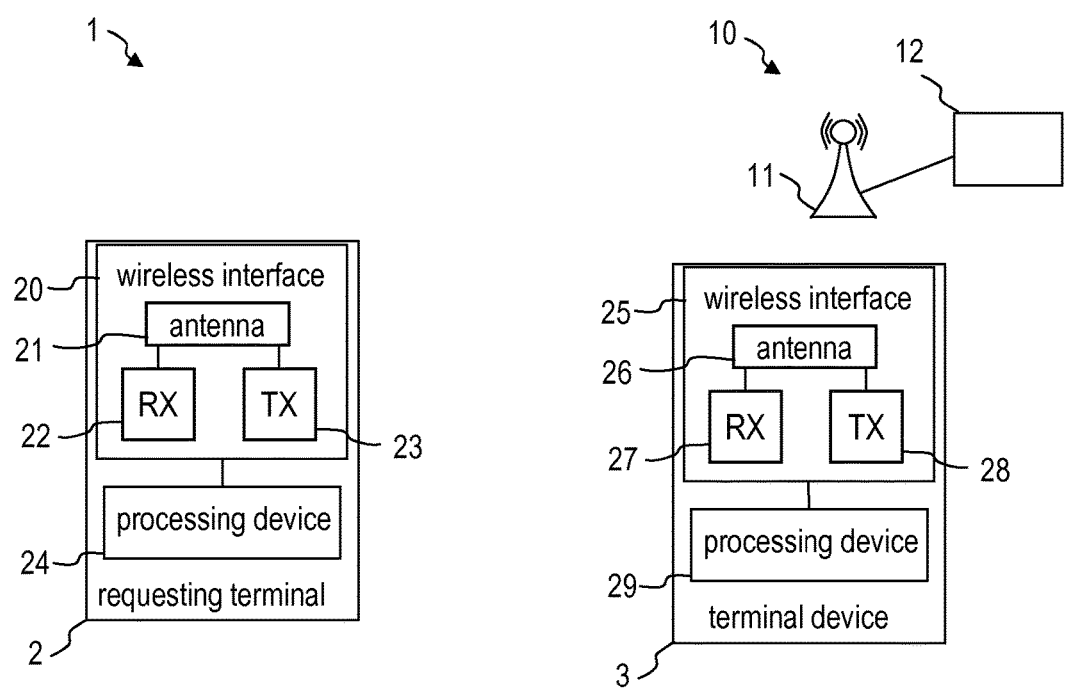
FIG. 2 shows the communication system of FIG. 1, in which a terminal device transmits configuration information indicating its suitability to start acting as a relay.

FIG. 2 is a schematic block diagram of a communication system 1 according to an embodiment. The base station 11 of the RAN 10 is connected to a node 12 of the RAN or the core network (CN). For illustration, for a base station 11 implemented as an eNodeB, the node 12 may be implemented as an MME or S-GW.

The terminal device 3 has a wireless interface 25. The wireless interface 25 may be configured to communication with the RAN 10. The wireless interface 25 may be configured for communication over the E-UTRA air interface.

The terminal device 3 may be operative to execute a relay function which can be selectively activated. When the relay function is activated, the terminal device 3 may act as a relay which relays messages between the other terminal 2 and the base station 11. In the uplink, the terminal device 3 may receive data or signaling messages from the other terminal 2 at a receiver path 27 and may re-send the messages to the base station 11 via a transmitter path 28 and antenna 26. In the downlink, the terminal device 3 may receive other data or signaling messages from the base station 11 and may re-send the messages to the other terminal 2. The relay function may be deactivated upon request from the base station 11 or upon request from the other terminal 2. The relay function may be executed under the control of a processing device 29. The processing device 29 may comprise one or several microprocessors, one or several microcontrollers, one or several processors, one or several controllers, one or several application specific integrated circuits (ASICs) and/or a combination of such devices. The processing device 29 may be configured to control the wireless interface 25 to detect at least one other terminal 2 located in proximity to the terminal device 3.

The processing device 29 may be configured to generate one or several data elements that are related to the relay function of the terminal device 3. The data element(s) may be indicative for how suitable the terminal device 3 is for acting as a relay. Generating at least one data element may comprise monitoring the terminal device 3 at least throughout a time interval to collect historical data and analyzing the historical data. For illustration, the monitoring may comprise monitoring a movement of the terminal device 3 to generate mobility data indicative of an averaged movement velocity of the terminal device 3. Generation of at least one data element may comprise monitoring the terminal device 3 at least throughout a time interval to collect historical data relating to output power capability, available bandwidth, or channel quality, and analyzing the historical data. Generating at least one other data element may comprise querying a sensor of the terminal device 3 or retrieving data from a memory. For illustration, a battery level may be determined by evaluating an output signal of a sensor and/or reading data indicative of a battery level from a memory.

The processing device 29 may be configured to generate a message which includes the configuration information. The configuration information may include one or several data elements which may have an impact on how suitable the terminal device 3 is for acting as a repeater. The processing device 29 may control the wireless interface 25 to transmit the message to the other terminal 2 which is attempting to identify a terminal device suitable for acting as a relay.

The processing device 29 may be configured to control the wireless interface 25 to transmit the message which includes the configuration information as an RRC Radio Resource Control (RRC) signaling message or a Non Access Stratum (NAS) signaling message. The processing device 29 may be configured to control the wireless interface 25 to transmit the message which includes the configuration information as Internet Protocol (IP) communication.

The other terminal 2 has a wireless interface 21. The wireless interface 21 may be configured to communication with the RAN 10. The wireless interface 21 may be configured for communication over the E-UTRA air interface.

The other terminal 2 has a processing device 25 connected to the wireless interface 21. The processing device 25 may comprise one or several microprocessors, one or several microcontrollers, one or several processors, one or several controllers, one or several application specific integrated circuits (ASICs) and/or a combination of such devices. The processing device 25 may be configured to control the wireless interface 21 to detect the terminal device 3 located in proximity to the other terminal 2. The processing device 25 may be configured to control a transmitter path 24 of the wireless interface 21 to transmit a request for configuration information to the terminal device 3 via an antenna 22. The processing device 25 may be coupled to a receiver path 23 of the wireless interface 21 to process a message transmitted by the terminal device 3, the message including configuration information related to the suitability of the terminal device 3 for acting as a relay. The processing device 25 may be configured to perform a prioritization among the terminal device 3 and at least one other candidate relay based on the configuration information included in the message. The processing device 25 may execute a selection mechanism to select the terminal device 3 or another candidate relay for acting as a relay. The processing device 25 may be configured to control the transmitter path 24 to transmit a relay transition request to the terminal device 3 or to another candidate relay to request activation of the relay function.

As will be described in more detail with reference to FIG. 3 to FIG. 10 in the following, the terminal device 3 performs a signaling which allows the other terminal 2 to determine whether the terminal device 3 is suitable for transitioning into a relay. The other terminal 2 may select the one among several terminal devices which is most suitable to start acting as a relay, when taking into account one or several of network coverage by the RAN 10, output power capability of the terminal devices, and/or mobility of the terminal devices. The other terminal 2 may also determine whether it should perform a handover to another terminal device which acts as a relay, taking into account one or several of network coverage by the RAN 10, output power capability of the terminal devices, and/or mobility of the terminal devices. The signaling between the terminal device 3 and at least one other terminal 2 may be implemented as direct communication which does not transit the communication network.

The D2D communication between the terminal device 3 and the other terminals 2, 5 located in proximity to the terminal device 3 may be implemented as described in 3GPP TS 22.278. For illustration, the D2D discovery and the D2D communication may be implemented as described in 3GPP TS 22.278 V12.3.0 (2013-06) entitled "3rd Generation Partnership Project; Technical Specification Group Services and System Aspects; Service requirements for the Evolved Packet System (EPS) (Release 12)". The D2D communication may be used for the signaling performed by the terminal device to provide at least one other terminal with configuration information related to a relay function of the terminal device.

The D2D communication between the terminal device 3 and the other terminals 2, 5 located in proximity to the terminal device may be implemented as described in 3GPP TR 22.803. For illustration, the D2D discovery and the D2D communication may be implemented as described in 3GPP TR 22.803 V12.2.0 (2013-06) entitled "3rd Generation Partnership Project; Technical Specification Group Services and System Aspects; Feasibility study for Proximity Services (ProSe) (Release 12)". The D2D communication may be used for the signaling performed by the terminal device to provide at least one other terminal with configuration information related to a relay function.

Implementations of this signaling will be described with reference to FIG. 3 to FIG. 10 in the following. The D2D communication may also be used for relaying messages between the terminal device 3 and the at least one other terminal 2 after the relay function has been activated.

The D2D communication may be performed via the wireless interface of the UE which is configured to communicate with the RAN 10, e.g. with an E-UTRAN. The D2D communication may be performed via the wireless interfaces of the terminal devices which are configured to communicate with the RAN 10, e.g. with an E-UTRAN. The signaling performed to provide at least one other terminal with configuration information related to a relay function may be implemented as Proximity Service (ProSe) communication as defined in 3GPP TR 23.703 referred to above. For illustration, signaling performed to provide at least one other terminal with configuration information related to a relay function may be implemented as ProSe communication as described in 3GPP TR 23.703 V0.4.1 (2013-06) entitled "3rd Generation Partnership Project; Technical Specification Group Services and System Aspects; Study on architecture enhancements to support Proximity Services (ProSe) (Release 12)".

When the relay function of the terminal device 3 is activated, the terminal device 3 may have one or several physical cell identifiers of its own. Data communication relayed between the other terminal 2 and the radio access network 10 may be provided with a cell identifier of the terminal device 3. The cell identifier(s) of the cell(s) which are under the control of the terminal device 3 may be assigned by an eNodeB of the radio access network, e.g. by a NodeB which acts as a Donor eNodeB (DeNB). The terminal device 3 may be configured to broadcast its own synchronization signals and system information when the relay function is activated. The terminal device 3 may be configured to perform scheduling for uplink and downlink messages on an interface between the terminal device 3 and the radio access network.

Figure 3:
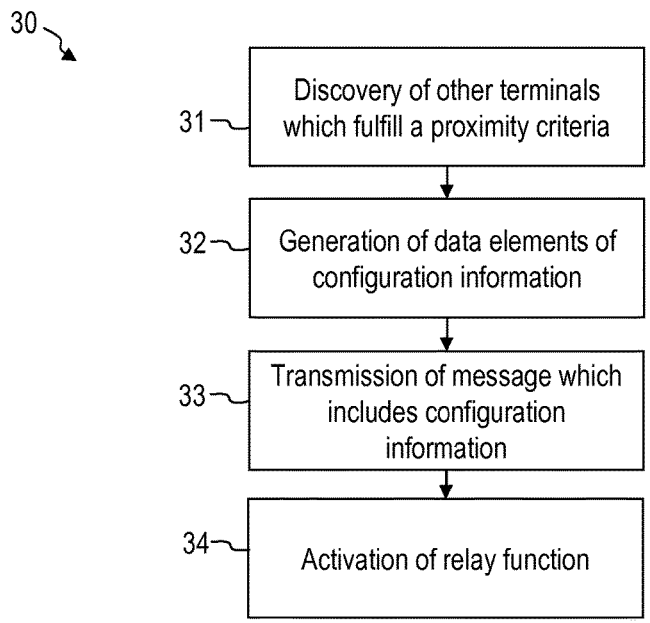
FIG. 3 is a flow chart of a method according to an embodiment.

FIG. 3 is a flow chart of a method 30 according to an embodiment. The method 30 may be performed by a terminal device according to an embodiment or by a communication system according to an embodiment.

At 31, the terminal device discovers at least one other terminal located in a proximity of the terminal device. The signaling performed in the discovery at step 31 may be implemented as D2D communication. The signaling may be implemented by the terminal device to detect at least one other ProSe-enabled UE which fulfills proximity criteria, as defined in 3GPP TR 22.803 V12.2.0 (2013-06). Messages transmitted in the discovery may be transmitted directly between the terminal device and the at least one other terminal, without transiting the base station or another node of the wireless communication network. The discovery at step 31 may be used to identify at least the other terminals which are located within a pre-defined distance range from the terminal device 3 and which are ProSe-enabled. The discovery at step 31 may be used to identify at least one other terminal device which, in a D2D communication with the terminal device 3 which does not transit the RAN, produces a signal strength at the terminal device 3 which fulfills a stability criterion. For illustration, the D2D discovery may be used to identify other terminals with which a stable direct communication may be established when the messages do not transition the RAN.

At 32, the terminal device may generate data elements which relate to a relay function of the terminal device. The data elements may include information which allow the at least one terminal identified at 31 to establish whether the terminal device would be suitable for acting as a repeater. The data elements generated for transmission may include one or several of mobility data for the terminal device indicative of a movement velocity of the terminal device;

an output power capability indicator indicating an output power of the terminal device which is available for the relay function;

channel quality information providing historical data on radio channel properties of the terminal device;

data capability information indicating an available data transfer capability of the terminal device;

relay capacity information indicating for how many other terminals the terminal device is capable of relaying communication;

power supply information determined based on a power supply available at the terminal device.

At 33, the terminal device may transmit a message which includes configuration information related to the relay function. The configuration information may comprise the data elements generated at 32. The message may additionally comprise an identifier identifying the purpose of the message. The identifier may indicate that the message is a signaling message for providing configuration information related to a relay function of the terminal device which can execute the relay function. The message may include a unique identifier for the terminal device which transmits the message. The message may be transmitted as ProSe one-to-one communication or as ProSe one-to-many communication as defined in 3GPP TR 22.803 V12.2.0 (2013-06). The relay function may still be deactivated when the message is transmitted at 33.

Transmission of the message at 33 may be triggered when a requesting terminal of the at least one other terminal detected at 31 requests transmission of the configuration information. The transmission of the message at 33 may be triggered by a relay information request received from the at least one other terminal, which requests information on a repeater capability and configuration information related to a relay function of the terminal device. The terminal device may announce its relay capability to the at least one other terminal detected at 31, as will be explained in more detail with reference to FIG. 5.

The configuration information may be used by the at least one other terminal to determine whether the terminal device is suitable for acting as a relay. The at least one other terminal device may perform a prioritization among the terminal device which transmits the message with the configuration information at 32 and at least one other candidate relay to determine the device which is most suitable to start acting as a relay. For illustration, the terminal device may be selected as a repeater if it is stationary, and/or is able to transmit at high output power when relaying communication.

At step 34, the terminal device may activate its relay function. Activation of the relay function may be triggered by a relay transition request received from the at least one other terminal to which the message was transmitted at step 32.

The terminal device may execute an activation procedure for the relay function. The activation procedure for the relay function may include asking a base station for permission to start acting as a repeater. When the base station acknowledges the request, the terminal device may start relaying communication between the terminal which requests activation of the relay function and the base station.

Figure 4:
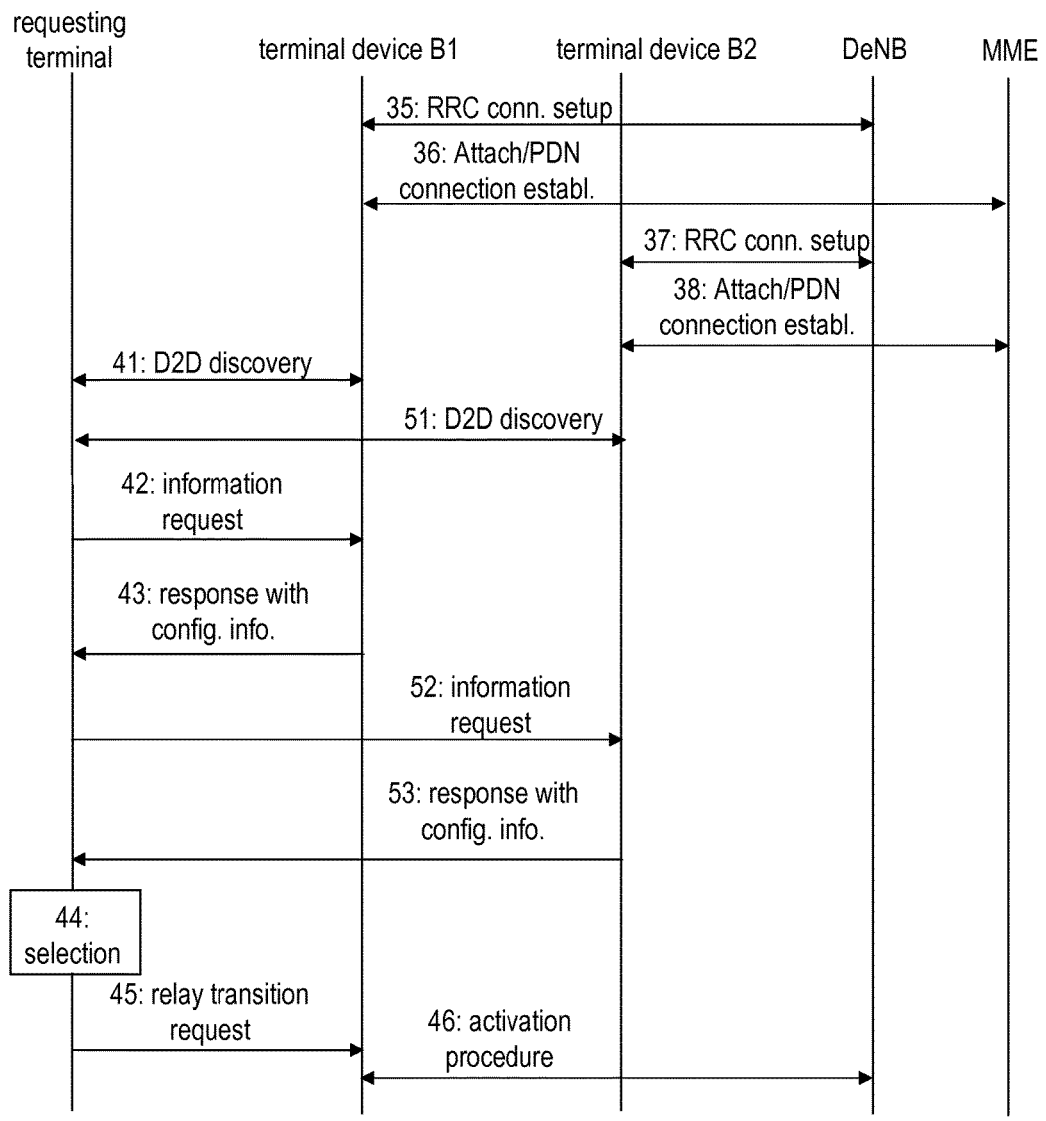
FIG. 4 is a diagram representing signaling in a method according to an embodiment.
Figure 5:
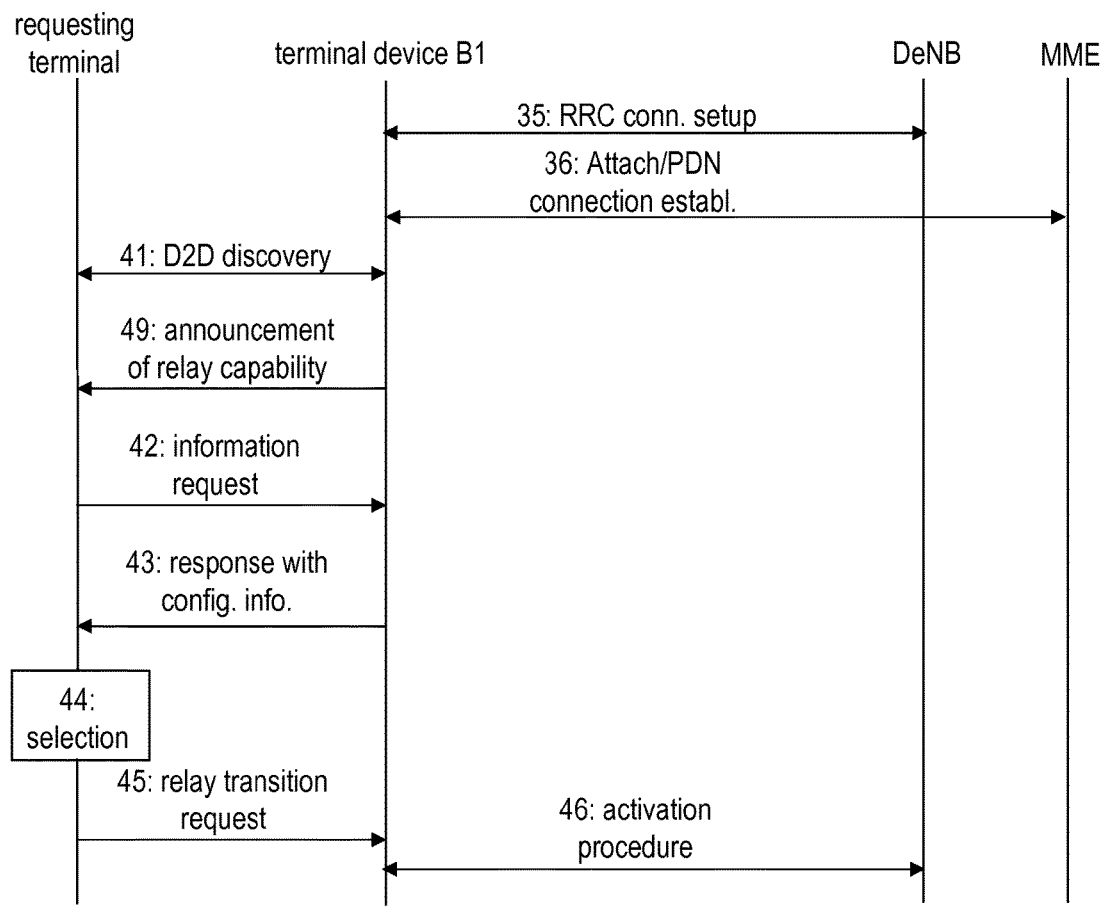
FIG. 5 is a diagram representing signaling in a method according to an embodiment.

FIG. 4 and FIG. 5 are diagrams which illustrate signaling in a method in which a terminal device transmits configuration information related to a relay function, so as to allow another terminal located in proximity to the terminal device to determine whether the terminal device would be suitable to start acting as a relay. In FIG. 4, the other terminal (referred to as "requesting terminal" in FIG. 4 to FIG. 6 because it requests activation of a relay function) which is outside of the coverage of the base stations of the wireless communication network initiates the signaling by requesting configuration information. In FIG. 5, the terminal device which is inside the coverage of a base station of the wireless communication network initiates the signaling by announcing its relay capability.

FIG. 4 is a diagram illustrating signaling in a method in which a requesting terminal requests activation of a relay function of a terminal device and initiates the associated signaling. While the signaling is illustrated for two terminal devices located in proximity to the requesting terminal, any other number of terminal devices may be located in proximity to the requesting terminal. The requesting terminal may be a UE. The requesting terminal may be a ProSe-enabled UE.

The terminal device(s) located in proximity to the requesting terminal are labeled terminal device B1 and terminal device B2 in FIG. 4. The terminal device(s) are connected to the base station before the requesting terminal can identify them as a suitable repeater. For this purpose, the first terminal device B1 may perform a connection setup. For illustration, the signaling of a Radio Resource Control (RRC) connection setup 35 may be performed. The first terminal device may perform an attach/packet data network (PDN) connection establishment 36. Similarly, the second terminal device B2 and/or other terminal devices located in proximity to the requesting terminal may perform a RRC connection setup 37 and an attach/PDN connection establishment 36 before the UE can identify them as suitable candidates for transitioning into a repeater.

The connection establishment may be performed using the signaling defined in 3GPP TS 36.331, for example. For illustration, the signaling defined in 3GPP TS 36.331 V11.4.0 (2013-06) entitled "3rd Generation Partnership Project; Technical Specification Group Radio Access Network; Evolved Universal Terrestrial Radio Access (E-UTRA); Radio Resource Control (RRC); Protocol specification (Release 11)" may be used for the connection establishment between the terminal devices and the RAN.

In a D2D discovery 41, the requesting terminal detects the presence of the first terminal device (labeled B1 in FIG. 4). In a D2D discovery 51, the requesting terminal detects the presence of the second terminal device (labeled B2 in FIG. 4).

The requesting terminal transmits an information request 42 for configuration information related to the relay function to the first terminal device. The information request 42 may also be used to request information on a repeater capability of the first terminal device. In response to receiving the information request 42, the first terminal device transmits a response 43 which includes configuration information. The configuration information for the first terminal device included in the response 43 may include an indicator for a network coverage quality at the first terminal device and/or terminal related information. At least some of the configuration information may be measured at the first terminal device. For illustration, the configuration information may include one or several of mobility data determined based on historical movement of the first terminal device and/or an output power capability indicator indicating an output power of the first terminal device which is available for the relay function and/or channel quality information providing historical data on radio channel properties of the first terminal device and/or data capability information indicating an available data transfer capability of the first terminal device and/or relay capacity information indicating for how many other terminals the first terminal device is capable of relaying communication and/or power supply information which may indicate whether there is a limit in terms of available power supply capacity.

The requesting terminal transmits an information request 52 for configuration information to the second terminal device. The information request 52 may also be used to request information on a repeater capability of the second terminal device. In response to receiving the information request 52, the second terminal device transmits a response 53 which includes configuration information. The configuration information for the second terminal device included in the response 53 may include an indicator for a network coverage quality at the second terminal device and/or terminal related information. At least some of the configuration information may be measured at the second terminal device. For illustration, the configuration information may include one or several of the data elements discussed in connection with the response 43.

The response 43, 53 may be an RRC Radio Resource Control (RRC) signaling message or a Non Access Stratum (NAS) signaling message. The response 43, 53 may be Internet Protocol (IP) communication.

In response to receiving a response 43, 53 from the terminal device(s), the requesting terminal may perform a selection 44. The selection 44 may include a prioritization among the terminal device(s) which transmitted a response 43, 53 comprising configuration information related to a relay function of the respective terminal device.

The requesting terminal transmits a relay transition request 45 to the selected terminal device. For illustration, if the first terminal device B1 is given priority over the second terminal device B2 in the selection 44, the relay transition request 45 is transmitted to the first terminal device B1. The relay transition request 45 indicates that the selected terminal device shall activate its relay function.

The relay transition request 45 triggers the selected terminal device to start the signaling for activating its relay function in an activation procedure 46. The signaling may involve the transmission of messages between the terminal device and the RAN of the wireless communication network. The signaling in the activation procedure 46 may be performed according to any one of the various techniques disclosed in PCT application PCT/IB2013/000949.

The signaling performed in the D2D discovery 41, 51 and/or in retrieving the relevant information from the terminal devices by messages 42, 43, 52, 53 and/or in requesting activation of the relay function by message 45 may be D2D communication which does not transit the RAN.

FIG. 5 is a diagram illustrating signaling in a method according to another embodiment in which a terminal device which is within the coverage of a base station of the wireless communication network may announce its repeater capability after D2D discovery. The terminal device which is within the coverage of a base station may thereby initiate the signaling which ultimately leads to the activation of its relay function.

The terminal device establishes a connection with the wireless communication network using signaling 35, 36 and performs a D2D discovery 41 as described with reference to FIG. 4.

The terminal device signals its relay capability to at least one other terminal detected in the D2D discovery 41. The terminal device may transmit an announcement message 49 of its relay capability to the requesting terminal and possibly other terminals detected in the D2D discovery 41. The announcement message 49 may include information indicating that the terminal device has a relay function which may be activated.

The requesting terminal may transmit a request 42 to request configuration information related to the relay function, and the terminal device may transmit a response 43 which includes the configuration information as explained with reference to FIG. 4. The response 43 does not need to include information on the relay capability because the repeater capability was already announced with the announcement message 49. The configuration information included in the response 43 may include any one or any combination, of the various data elements explained with reference to FIG. 4.

Some or all of the configuration information may also be included in the announcement message 49. The requesting terminal may still transmit the request 42 for configuration information at a later time. This allows changes in configuration information, e.g. changes in the output power capability or power supply of the terminal device, to be taken into account when determining whether the terminal device is suitable to start acting as a relay. The re-transmission of configuration information also allows the requesting terminal to determine whether it should switch to another relay and/or should start direct communication with a base station if possible.

While the signaling is illustrated for two terminal devices located in proximity to the requesting terminal in FIG. 4 and for one terminal device in FIG. 5, any other number of terminal devices may be located in proximity to the requesting terminal. Both the requesting terminal and the terminal device(s) which are candidate relays may be ProSe-enabled UEs. The terminal device(s) which are candidate relays may be ProSe-enabled Public Safety UE(s).

Figure 6:
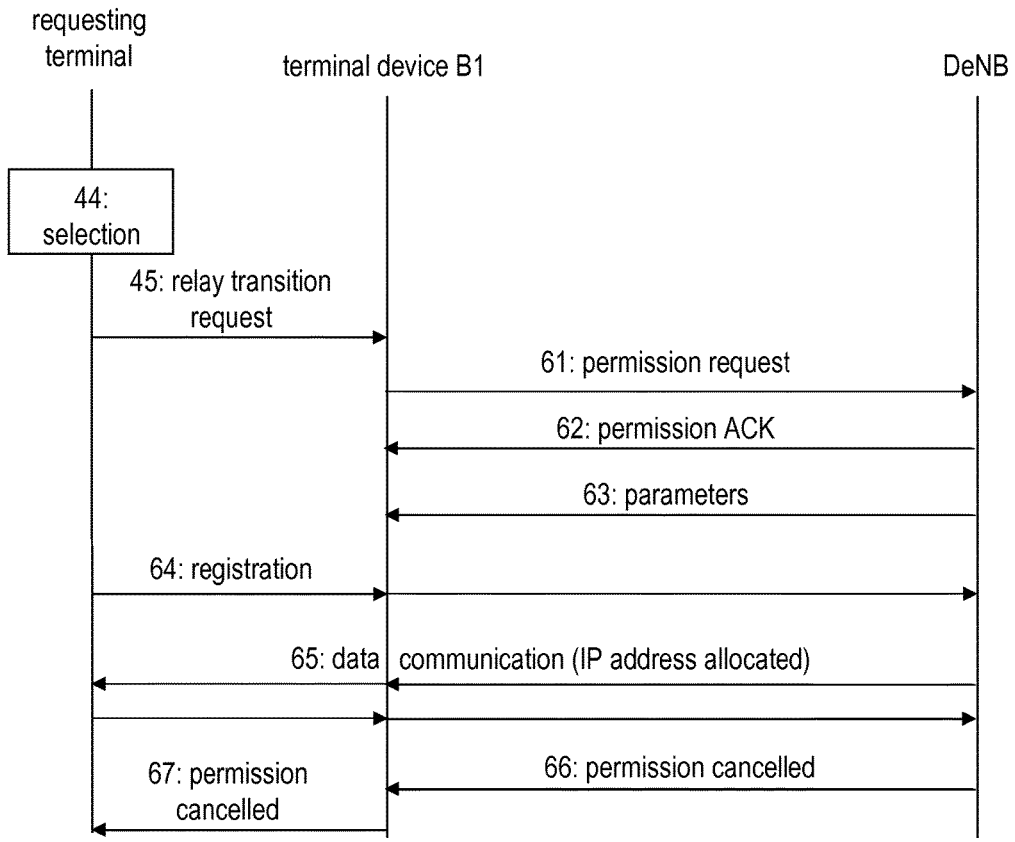
FIG. 6 is a diagram representing signaling in a method according to an embodiment.

FIG. 6 illustrates an exemplary implementation of the signaling performed between the terminal device and the base station to activate the relay function of the terminal device.

In response to receiving the relay transition request 45, the terminal device may send a permission request 61 to the base station. The permission request 61 is transmitted to request permission for activating the relay function of the terminal device.

The terminal device receives a response from the base station. If the base station gives permission for activating the relay function of the terminal device, the base station may transmit a permission acknowledgment message 62 to the terminal device. If a permission acknowledgment 62 is received from the base station, the terminal device may receive parameters 63 for configuring the relay function from the base station. For illustration, the parameters may define a maximum output power of a radio signal for forwarding communication data to the requesting terminal, a cell identifier to be used by the terminal device in case it sets up a new radio cell, a neighbor cell identifier of a neighbor base station located in the neighborhood of the base station, and a frequency band for a radio signal for forwarding data or signaling messages to the requesting terminal. The relay function is then activated in the terminal device. The relay function may be performed under the control of a processing device of the terminal device.

The requesting terminal may perform a registration 64 which may be relayed by the terminal device to the base station. In the subsequent data communication 65, the terminal device may forward data communication in the uplink received from the requesting terminal to the base station. The data communication may be performed as data communication with IP address allocated. The terminal device may forward data communication in the downlink received from the base station to the requesting terminal. The transmission between the requesting terminal and the terminal device may be implemented as D2D communication. This leg of the transmission path, i.e. the leg between the requesting terminal and the terminal device which acts as a relay, may be implemented such that the messages do not transit the base station.

The relay function of the terminal device may be implemented such that a received data message from the requesting terminal in the uplink is forwarded to the base station without modifying digital data included in the respective data message. The relay function of the terminal device may be implemented such that a received data message from the base station in the downlink is forwarded to the requesting terminal without modifying digital data included in the respective data message. In this case, the digital data content of traffic and/or signaling messages may be identical when forwarding the message, while radio parameters (e.g. frequency band etc.) may still be different.

The relay function of the terminal device may be implemented such that a portion of the digital data included in a data message or in a signaling message transmitted in the downlink and/or uplink is modified before the relay function of the terminal device forwards the message. For illustration, a new cell identifier may be assigned for a cell set up by the terminal device when acting as a repeater. The relay function in the terminal device may then respectively replace cell identifiers in the uplink and downlink communication when forwarding data messages or signaling messages between the requesting terminal and the base station. I.e., the terminal device, while still acting as a relay, may also modify at least some data of the messages forwarded between the requesting terminal and the base station.

The leg of the transmission path between the requesting terminal and the terminal device which acts as a relay may include the transmission of both traffic and signaling over a Uu interface. The leg of the transmission path between the terminal device which acts as a relay and the base station may include the transmission of both data and signaling messages over a Un interface.

The relay function of the terminal device may be deactivated at any time. For illustration, the relay function may be deactivated upon receiving a corresponding request 66 from the base station. In this case, the terminal device may transmit a permission cancelled message 67 to the requesting terminal to inform the requesting terminal that the base station has cancelled the permission. Alternatively or additionally, the relay function may be deactivated upon request from the requesting terminal.

The transition of a terminal device to a relay may be implemented as a Proximity Service (ProSe). The proximity based service may be selectively enabled. The proximity based service may be selectively enabled depending on, for example, whether the requesting terminal indicates that it requires the relay function in an emergency situation or other Public Safety scenario, as will be explained in more detail with reference to FIG. 8. Alternatively or additionally, the terminal devices located in proximity to the requesting terminal may use any one of a variety of other criteria for deciding whether they are capable of activating the relay function for the UE. For illustration, a network operator and/or the user of a terminal device may specify criteria for activating relay function, e.g., activating the relay function selectively depending on an identifier of a requesting terminal, such that the relay function may only be offered to requesting terminals operated by certain organizations or persons, or activating the relay function only when a neighbor base station of the serving base station has a failure. The users of some terminal devices may also indicate that the respective terminal devices shall not to act as a relay in general, with the exception of relaying emergency communication or other Public Safety related communication.

Figure 7:
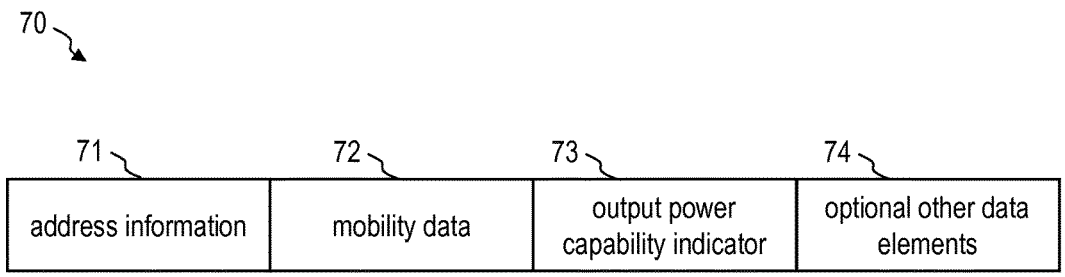
FIG. 7 is a diagram representing configuration information transmitted by a terminal device according to an embodiment.

FIG. 7 illustrates a message 70 transmitted by a terminal device according to an embodiment, which includes configuration information related to a relay function of the terminal device. The message 70 may be transmitted as response 43 in the signaling explained with reference to FIG. 4 or FIG. 5. The message 70 may be an RRC Radio Resource Control (RRC) signaling message or a Non Access Stratum (NAS) signaling message. The message 70 may be Internet Protocol (IP) communication.

The message 70 may include one or several data elements 72-74 which are each associated with a relay function of the terminal device which transmits the message 70. The data element(s) 72-74 form the configuration information which allows at least one terminal device located outside the coverage of the base stations to determine whether the terminal device would be suitable for acting as a repeater.

The configuration information may include mobility data 72. The terminal device may be configured to determine the mobility data 72 based on historical movement of the terminal device. The terminal device may monitor location changes and may compute a quantifier for its mobility based thereon. For illustration, the number of times the terminal device changed the serving radio cell may be used to quantify its mobility, e.g. as a measure of an average movement velocity. Other indicators may be used, e.g. indicators for distances over which the terminal device has moved in a pre-defined time interval. Mobility statistics is generally detected in many terminal devices. This mobility statistics may be used to generate an indicator for the terminal device mobility which is included in the configuration information.

More complex techniques may be used by the terminal device to generate the mobility data 72. For illustration, the position or position changes of the terminal device may be monitored. A signal of a positioning system and/or other position, velocity or acceleration sensor may be evaluated to monitor a movement velocity of the terminal device. An average velocity may be computed and may be used as mobility data 72.

Additionally or alternatively, the configuration information may include an output power capability indicator 73 indicating an output power of the terminal device which is available for the relay function. The output power available for the relay function may be configured by the wireless communication network, for example. The terminal device may determine the output power capability indicator based on its power supply and/or parameters set in the terminal device. The output power capability indicator may indicate an upper bound or maximum of an output power available for the relay function for communication towards the other terminal for which the terminal device will act as a relay.

Additionally or alternatively, the configuration information may include channel quality information included as data element 74 in the configuration information. The channel quality information may provide historical data on radio channel properties of the first terminal device. The terminal device may be configured to monitor a received signal strength for signals received from the base station and may generate an indicator for the channel quality based thereon. Quality indicators other than the received signal strength may be used in addition or alternatively, e.g. signal-to-noise etc.

Additionally or alternatively, the configuration information may include data capability information included as data element 74 in the configuration information. The data capability information may indicate an available data transfer capability of the terminal device. The terminal device may be configured to monitor an available bandwidth and/or processing loads to determine the data capability information.

Additionally or alternatively, the configuration information may include relay capacity information included as data element 74 in the configuration information. The relay capacity information may indicate for how many other terminals the terminal device is capable of relaying communication. The relay capacity information may be configured in the terminal device by a network operator and/or may be a predefined, fixed number which may be stored in the terminal device.

Alternatively or additionally, the configuration information may include a power supply indicator for the terminal device included as data element 74 in the configuration information. The terminal device may monitor a battery level to generate the power supply indicator.

Alternative or additional data elements may be included in the configuration information.

The message 70 may include further information. The message 70 may include address information 71, which may include a unique identifier for the terminal device which transmits the message 70. The message 70 may include identifier(s) of at least one ProSe-enabled UE located outside the coverage of the wireless communication network, to which the message 70 is transmitted.

Figure 8:
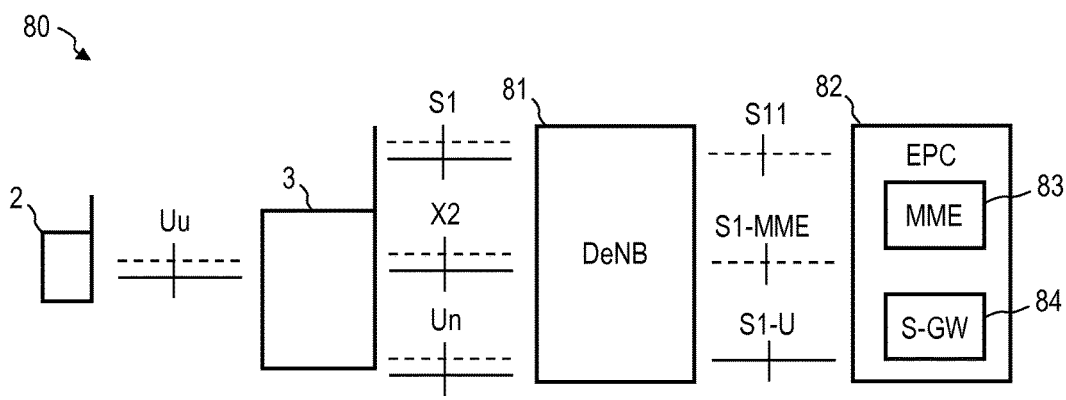
FIG. 8 is a block diagram illustrating an architecture and interfaces of a communication system including a terminal device according to an embodiment.

FIG. 8 illustrates an architecture of a communication system having a terminal device 3 according to an embodiment. At least one other terminal 2 requests the terminal device 3 to start acting as a relay. The terminal device 3 and the at least one other terminal 2 may respectively be a ProSe-enabled UE. An eNodeB of an E-UTRAN may act as a Donor eNodeB (DeNB) 81.

The terminal device 3 may have one or several physical cell identifiers assigned to it. The one or more physical cell identifiers may be assigned by the DeNB or another node of the wireless communication network. The terminal device 3 may broadcast its own synchronization signals and system information. The terminal device 3 may also be responsible for scheduling uplink and downlink transmission on the Un interface between the terminal device 3 and the DeNB 81. The terminal device 3 may thereby set up a radio cell of its own, to which the at least one other terminal 2 is connected while being located outside the coverage of the radio cell of the DeNB 81.

The DeNB 81 may control the terminal device 3 which acts as a relay. The DeNB may configure the relay function of the terminal device 3, as explained with reference to FIG. 6, for example.

Traffic and signaling between the terminal device 3 and the at least one other terminal 2 may be transmitted over a Uu interface. Traffic and signaling between the terminal device 3 and the DeNB may be transmitted over a Un interface. The Un and Uu interfaces can use the same carrier frequency or may use different carrier frequencies.

An X2 interface between the DeNB 81 and the terminal device 3 may support a handover between the terminal device 3 and another base station. The X2 interface may use the Un interface to transport data and signaling messages. The DeNB 81 may transmit data and signaling messages to another eNodeB (not shown) via the X2 interface.

The S1 interface allows the relay function of the terminal device 3 to communicate directly with a serving gateway (S-GW) 84 and/or a Mobility Management Entity (MME) 83 of the evolved packet core (EPC) 82. The S1-MME interface may be used for signaling between the MME 83 and the terminal device 3. The S1-U interface may be used for data messages.

The S11 interface allows the MME 83 to configure S1 tunneling functions inside the DeNB 81, by treating it in the same way as an S-GW.

All interfaces may be configured in accordance with 3GPP TR 36.806. For illustration, all interfaces may be configured in accordance with 3GPP TR V9.0.0 (2010-03) entitled "3rd Generation Partnership Project; Technical Specification Group Radio Access Network; Evolved Universal Terrestrial Radio Access (E-UTRA); Relay architectures for E-UTRA (LTE-Advanced) (Release 9)".

Figure 9:
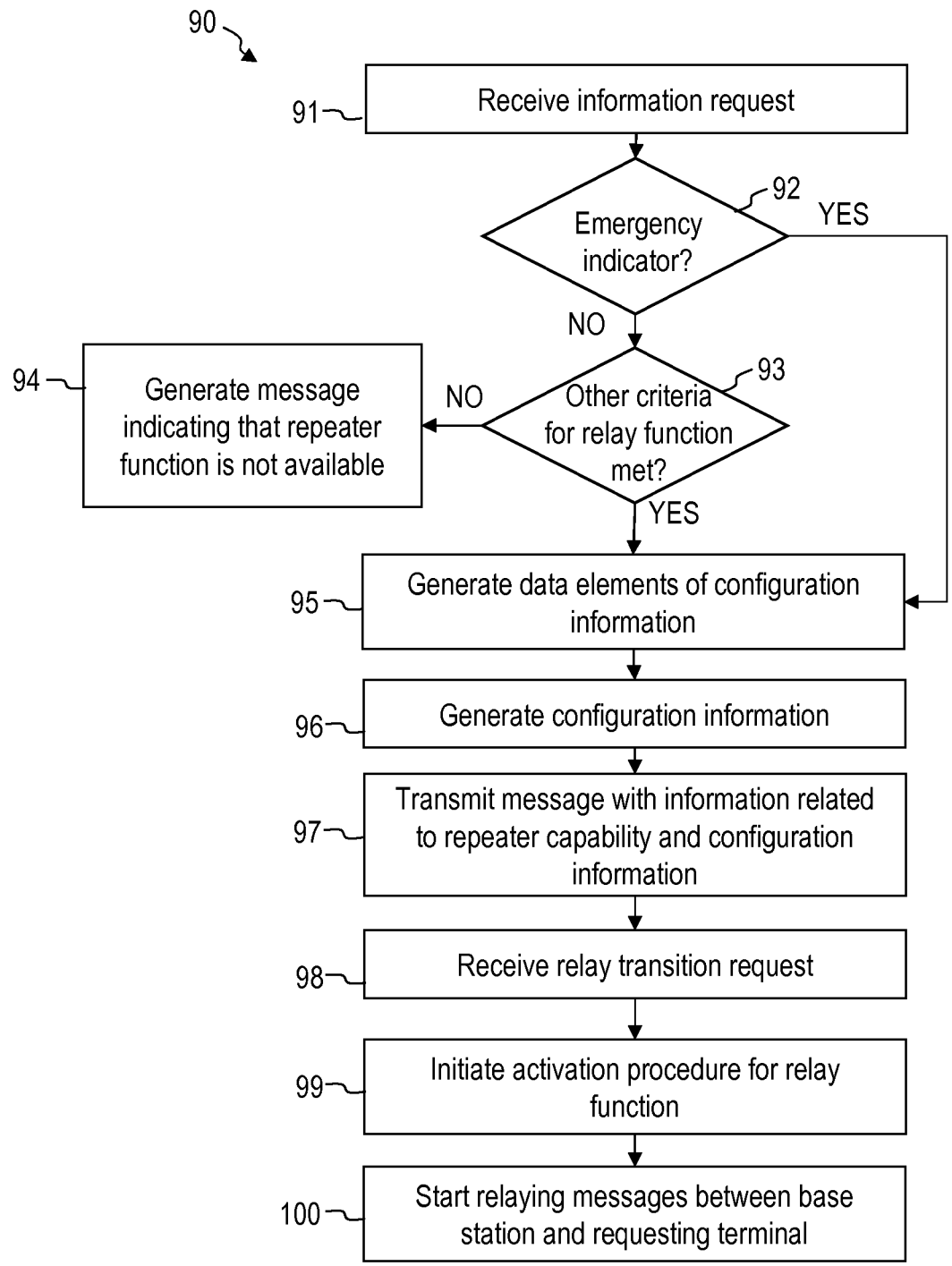
FIG. 9 is a flow chart of a method according to an embodiment.

FIG. 9 is a flow chart is a flow chart of a method 90 which may be performed by a terminal device according to an embodiment. The terminal device may have any one of the configurations explained with reference to FIG. 1 to FIG. 8. The method may be performed to inform at least one other terminal of configuration information related to the relay function of the terminal device.

At 91, the terminal device receives an information request from at least one other terminal. The at least one other terminal may be sufficiently close to the terminal device such that the terminal device and the at least one other terminal fulfill proximity criteria.

At 92, the terminal device determines whether an indicator for emergency communication is included in the information request received from the at least one other terminal. If an indicator for emergency communication is included, the method proceeds to step 95 to generate data elements for a message which includes configuration information related to the relay function. Otherwise, the method may proceed to step 93.

At 93, the terminal device may determine whether it may activate its relay function for any other reason. For illustration, the terminal device may determine based on user preferences stored in a memory of the terminal device and/or based on settings defined by a network operator whether it may act as a relay for nonemergency communication. The terminal device may also determine based on user preferences stored in the memory of the terminal device, based on settings defined by a network operator or based on a user input whether a condition is fulfilled in which it may activate its relay function for the at least one other terminal. If the terminal device determines that it may not activate its relay function for the at least one other terminal, the method proceeds to step 94. At 94, a message may be generated and transmitted to the at least one other terminal. The message at 94 may indicate that the terminal device is not capable of acting as a relay for the at least one other terminal. If the terminal device determines that it may activate its relay function for the at least one other terminal, the method proceeds to step 95.

At 95, data elements of the configuration information related to the relay function are generated. The data elements may include any one or any combination of the data elements explained with reference to FIG. 1 to FIG. 8. The terminal device may continuously or intermittently collect data relating to the movement and/or output power capability and/or power supply of the terminal device, for example, and may generate the data elements at 95 based thereon. Collection of the data that is evaluated at 95 to generate the data elements of the configuration information may be started even before the request at step 91 is received. For illustration, the terminal device may monitor a received signal strength for signals received from the base station and may generate an indicator for the network coverage quality based thereon. The terminal device may monitor location changes and may compute a quantifier for its mobility based thereon. The terminal device may monitor a battery level to generate a power supply indicator.

At 96, configuration information is generated. The configuration information includes one or several data elements generated at 95 and related to the relay function. The configuration information may include one or several data elements which allow the at least one other terminal to determine whether the terminal device would be suitable for acting as a relay.

At 97, the terminal device transmits a message to the at least one other terminal from which the request was received at 91. The message includes the configuration information related to the relay function.

If the terminal device is selected for acting as a relay, steps 98-100 may subsequently be performed. At 98, the terminal device receives a relay transition request from the other terminal. At 99, the terminal device starts an activation procedure for its relay function. At 100, the terminal device starts relaying data messages and/or signaling messages between the base station and the other terminal.

Figure 10:
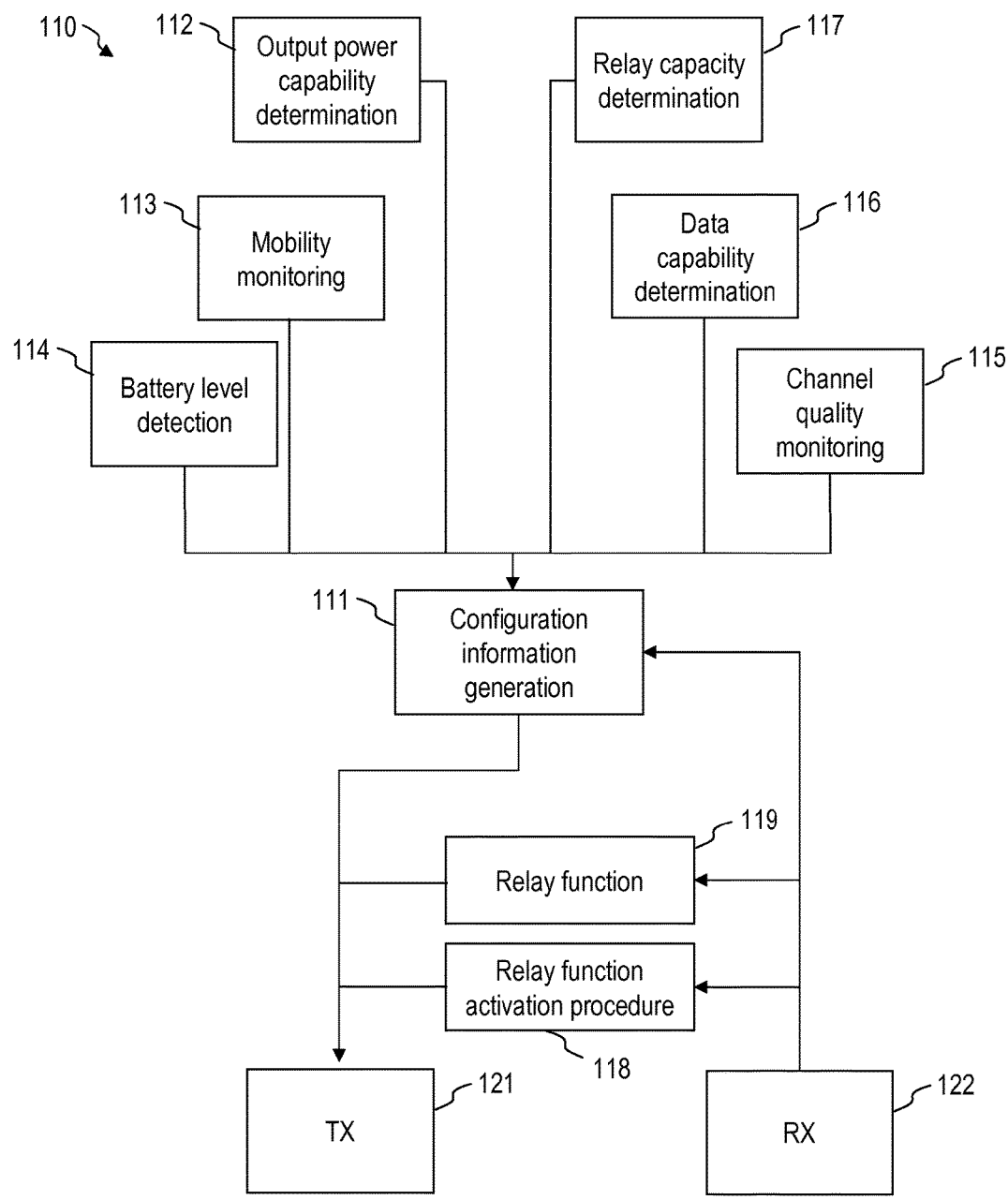
FIG. 10 is a functional block diagram of a terminal device according to an embodiment.

FIG. 10 is a functional block diagram of a terminal device according to an embodiment. The various functions may be performed by the processing device 29 of a terminal device 3 according to an embodiment. Not all of the various functions need to be implemented in the terminal device according to an embodiment.

The processing device 29 of the terminal device 3 may be configured to execute a configuration information generation function 111. The configuration information generation function 111 may be executed in response to receiving a request for configuration information at a processing path 122 for receive data. The configuration information generation function 111 may control the processing path 121 for transmit data to transmit a message which includes configuration information related to a relay function. The message may be generated to include information on a repeater capability of the terminal device 3, indicating whether the terminal device 3 can transition into a relay for relaying data and signaling messages.

The processing device 29 of the terminal device 3 is configured to generate the message such that it includes configuration information for the terminal device 3. The processing device 29 may execute functions for generating data elements of the configuration information.

For illustration, a function 112 for determining an output power capability for the relay function may be performed. The function 112 may determine the output power capability based on configuration settings of the relay function set by a DeNB.

Alternatively or additionally, a function 113 for monitoring mobility may be performed. The function 113 for mobility monitoring may track changes in the serving radio cell, motion patterns, or other quantities indicative of a mobility of the terminal device 3. The function 113 for mobility monitoring may collect mobility statistics.

Alternatively or additionally, a function 114 for detecting a battery level may be performed. The function 114 may be operative to determine whether there is a limit in terms of available power supply if the relay function is activated.

Alternatively or additionally, a function 115 for monitoring a channel quality may be performed. The function 115 may monitor a received signal strength or signal-to-noise of data messages and/or signaling messages received from the radio access network.

Alternatively or additionally, a function 116 for determining a data capability may be performed. The function 116 may determine the data capability based on historical data of available bandwidths and/or based on configuration settings of the relay function set by a DeNB.

Alternatively or additionally, a function 117 for determining a relay capacity may be performed. The relay capacity may indicate for how many other terminals the terminal device may simultaneously perform relaying. The function 117 may determine the relay capacity based on information stored in a storage device or based on configuration settings of the relay function set by a DeNB.

The processing device 29 may execute an activation procedure 118 for the relay function. The activation procedure 118 may comprise requesting permission from the base station for the terminal device 3 to start acting as a repeater relay. The processing device 29 may be configured to execute a relay function 119. The relay function 119 may be operative to forward data messages or signaling messages between at least one other terminal device and the base station in the uplink and the downlink. The relay function may be operative to modify a portion of control data included in a message, e.g. identifiers for transmitting or receiving devices or a cell identifier.

In any one of the embodiments, a terminal device may transmit a message including configuration information not only when at least one other terminal located outside the coverage of the wireless communication network wishes to establish a communication path via a terminal device that is made to transition into a relay. The terminal device may transmit a message including configuration information to allow the at least one other terminal device to determine whether the terminal device may be a more suitable relay than the relay through which the at least one other terminal device already communicates with the radio access network.

Configuration information transmitted by terminal devices may also be used when a relaying connection is lost. This may occur due to the mobility of the terminal device which acts as a relay and/or mobility of the at least one other terminal which uses the terminal device as a relay.

When a relaying connection is lost, the at least one other terminal which is located outside of the coverage of the base station may use configuration information previously received from terminal devices which respectively have a relay function to identify a new terminal device that may transition into a relay. The at least one other terminal which is located outside of the coverage of the base stations may also request the terminal devices which are candidate relays to again transmit the configuration information related to the relay function of the respective terminal, to allow the at least one other terminal to identify a new terminal device that may transition into a relay.

The at least one other terminal which is located outside of the coverage of the base stations may determine whether it shall use old configuration information or request transmission of updated configuration information after loss of a relaying connection depending on any one of a variety of criteria. The criteria may include one or several of the time period elapsed since the configuration information was previously transmitted, mobility of the at least one other terminal which requires a relay and/or mobility of the terminal devices which are candidate relays, or a combination of both.

The terminal devices and/or base stations of communication systems according to embodiments may be configured to perform a handover procedure when the at least one other terminal moves into the coverage area of a base station of the wireless communication network while the terminal device acts as a relay. The base station which controls the terminal device may decide to deactivate relaying and to perform the handover procedure. The handover procedure may be performed such that the at least one other terminal for which the terminal device has acted as a relay continues direct communication with the same base station or another base station of the wireless communication network.

Embodiments of the invention have been described with reference to the drawings. In any one of the various embodiments, the procedure for causing a terminal device to transition into a repeater relay may be implemented as a proximity-based service. The signaling involved in the identification and selection of the terminal device may be performed as direct communication between the terminal devices and the at least one other terminal, which does not transit a base station of the wireless communication network.

In any one of the various embodiments, the signaling which includes the transmission of configuration information related to a relay function may be implemented on the first layer, the second layer or the third layer of the Open Systems Interconnection (OSI) layer model. The transmission of the message which includes the configuration information may be implemented on the first layer, the second layer or the third layer of the OSI layer model. The transmission of the message which includes the configuration information may be implemented as D2D signaling on the first, second or third layer of the OSI layer model.

In any one of the various embodiments, the signaling used to identify a terminal device which is suitable for acting as a relay may be performed without being inside the E-UTRAN network coverage.

Modifications or alterations may be implemented in other embodiments. For illustration, additional information may be included in the information request which is received by the terminal device and which causes the terminal device to transmit a message including configuration information. The additional information may be indicative of bandwidth requirements for the communication for which the relay function of the terminal device is needed. The additional information may be indicative of a type of service for which the relay function of the terminal device is needed.

For further illustration, while the message including the configuration information may be transmitted as a dedicated signaling message, e.g. as ProSe one-to-one communication, to each terminal of the at least one terminal, the repeater information request may also be transmitted as a broadcast or multicast message, e.g. as ProSe one-to-many communication. The D2D discovery may be omitted.

For further illustration, while exemplary data elements have been described which are suitable for transmission as configuration information in the repeater information response, other information may alternatively or additionally be included in the repeater information response as configuration information. For illustration, security-related information may be included in the configuration information.

Embodiments of the invention provide a signaling which allows a terminal located outside the coverage area of base stations to obtain the information required to select a terminal device which is suitable for transitioning into a repeater relay.

The invention claimed is:

1. A terminal device for wireless communication, comprising:
   a wireless cellular interface configured for communication with a radio access network of a cellular communication network; and
   a circuit to control the wireless cellular interface, the circuit operative to:
      transmit, to multiple terminal devices, an announcement message indicating that the terminal device is capable of acting as a relay,
      in response to transmitting the announcement message, receive a configuration information request from a requesting terminal device of the multiple terminal devices, wherein the configuration information request is configured to request at least security-related information related to a relay function of the terminal device,
      in response to receiving the configuration information request, transmit at least one message to at least the requesting terminal device, the at least one message, collectively, including (i) configuration information, (ii) the security-related information, and (iii) an indication of whether the terminal device is capable of relaying communication for additional terminal devices,
      receive a relay activation request from the requesting terminal device, and
      activate the relay function to start relaying communication between the requesting terminal device and the radio access network.

2. The terminal device of claim 1, wherein the terminal device is a proximity service enabled, ProSe-enabled, user equipment.

3. The terminal device of claim 2, wherein the terminal device is configured to transmit the at least one message as ProSe one-to-one communication to the requesting terminal device.

4. The terminal device of claim 2, wherein the terminal device is configured to transmit the at least one message as ProSe one-to-many communication to respectively one or more other terminal devices.

5. The terminal device of claim 1, wherein the at least one message which includes (i) the configuration information, which includes at least one data element selected from a group consisting of:
   mobility data for the terminal device indicative of a movement velocity of the terminal device;
   an output power capability indicator indicating an output power of the terminal device which is available for the relay function;
   channel quality information providing historical data on radio channel properties of the terminal device;
   data capability information indicating an available data transfer capability of the terminal device;
   relay capacity information further indicating how many other terminal devices the terminal device is capable of relaying communication; and
   power supply information determined based on a power supply available at the terminal device.

6. The terminal device of claim 5, wherein the configuration information transmitted over the wireless cellular interface in the at least one message includes at least both the mobility data and the output power capability indicator.

7. The terminal device of claim 1, wherein the terminal device is configured to relay communication between the requesting terminal device and a Donor eNodeB (DeNB) of the radio access network.

8. The terminal device of claim 7, wherein the terminal device is configured to communicate with the DeNB over a Un air interface.

9. The terminal device of claim 1, wherein the terminal device is a mobile telephone.

10. A communication system, comprising:
   a terminal device comprising:
      a wireless cellular interface for communication with a radio access network of a cellular communication network, and
      a circuit to control the wireless cellular interface, the circuit operative to:
         transmit, to multiple terminal devices, an announcement message indicating that the terminal device is capable of acting as a relay,
         in response to receiving a configuration information request from a requesting terminal of the multiple terminal devices, transmit at least one message to the requesting terminal device, the at least one message, collectively, including (i) configuration information, (ii) security-related information related to a relay function of the terminal device, and (iii) an indication of whether the terminal device is capable of relaying communication for additional terminal devices, and
         in response to receiving a relay activation request from the requesting terminal device, activate the relay function to start relaying communication between the requesting terminal device and the radio access network; and
   the requesting terminal device comprising:
      a further wireless cellular interface for communication with the radio access network, the requesting terminal device operative to:
         transmit the configuration information request to the terminal device, wherein the configuration information request is configured to request at least the security-related information,
receive the at one least message transmitted by the terminal device at the further wireless cellular interface, and
transmit the relay activation request to the terminal device.

11. The communication system according to claim 10, further comprising:
an eNodeB configured to act as a Donor eNodeB (DeNB),
wherein the terminal device is configured to relay communication between the requesting terminal device and the DeNB when the relay function of the terminal device is activated.

12. A method of providing information related to a relay function of a terminal device, the terminal device comprising a wireless cellular interface configured for communication with a radio access network of a cellular communication network, the method comprising:
transmitting, from the terminal device to multiple other terminal devices, an announcement message indicating that the terminal device is capable of acting as a relay;
in response to transmitting the announcement message, receiving, at the terminal device, a configuration information request from a requesting terminal device of the multiple other terminal devices, wherein the configuration information request is configured to request at least security-related information related to a relay function of the terminal device;
in response to receiving the configuration information request, transmitting, from the terminal device, at least one message to at least the requesting terminal device, the at least one message, collectively, including (i) configuration information, (ii) the security-related information, and (iii) an indication of whether the terminal device is capable of relaying communication for additional terminal devices;
receiving a relay activation request from the requesting terminal device; and
in response to receiving the relay activation request, activating the relay function to start relaying communication between the requesting terminal device and the radio access network.

13. The method of claim 12,
wherein the terminal device is a proximity service (ProSe) enabled user equipment, and
wherein transmitting the at least one message comprises:
transmitting the at least one message as ProSe one-to-one communication to the requesting terminal device.

14. The method of claim 12,
wherein the terminal device is a proximity service (ProSe) enabled user equipment, and
wherein transmitting the at least one message comprises:
transmitting the at least one message as ProSe one-to-many communication to respectively one or more other terminal devices.

15. The method of claim 12,
wherein the at least one message which includes the configuration information, which includes at least one data element selected from a group consisting of:
mobility data for the terminal device indicative of a movement velocity of the terminal device;
an output power capability indicator indicating an output power of the terminal device which is available for the relay function;
channel quality information providing historical data on radio channel properties of the terminal device;
data capability information indicating an available data transfer capability of the terminal device;
relay capacity information further indicating how many other terminal devices the terminal device is capable of relaying communication; and
power supply information determined based on a power supply available at the terminal device.

16. The method of claim 15,
wherein the configuration information includes at least:
mobility data for the terminal device indicative of a movement velocity of the terminal device, and
an output power capability indicator indicating an output power of the terminal device which is available for the relay function.

17. The method of claim 12, further comprising:
relaying communication between the requesting terminal and a Donor eNodeB (DeNB) of the radio access network over a Un air interface.

18. A terminal device comprising:
a wireless cellular interface for communication with a radio access network; and
a processor in communication with the wireless cellular interface and operative to:
receive at least one announcement message, each announcement message transmitted to multiple terminal devices and indicating that a terminal device transmitting the announcement message is capable of acting as a relay,
in response to receiving the at least one announcement message, transmit a configuration information request to at least one other terminal devices, wherein the configuration information request is configured to request at least security-related information related to a relay function of the terminal device,
in response to transmitting the configuration information request, receive, from one or more of the at least one other terminal devices, at least one message that includes (i) configuration information, (ii) the security-related information, and (iii) an indication of whether the terminal device is capable of relaying communication for additional terminals,
in response to receiving the at least one message, select the most suitable terminal device from amongst the one or more of the at least one other terminal devices as a relay, and
in response to selecting the most suitable terminal device as the relay, transmit a relay activation request to the selected terminal device,
wherein in response to activating a relay function at the selected device, communication between the terminal device and the radio access network is relayed through the selected terminal device.

19. A terminal device comprising:
a wireless cellular interface for communication with a radio access network; and
a processor in communication with the wireless cellular interface and operative to:
receive at least one announcement message, each announcement message transmitted to multiple terminal devices and indicating that a terminal device transmitting the announcement message is capable of acting as a relay,
in response to receiving the at least one announcement message, transmit a configuration information request to at least one other terminal devices, wherein the configuration information request is configured to request at least security-related information related to a relay function of the terminal device, and in response to transmitting the configuration information request, receive, from one or more of the at least one other terminal devices, at least one message that includes (i) configuration information, (ii) the security-related information, and (iii) an indication of whether the terminal device is capable of relaying communication for additional terminals.

* * * * *